United States Patent [19]
Vilkas et al.

[11] 3,852,360
[45] Dec. 3, 1974

[54] PREPARATION OF HYDROXYCITRONELLAL

[75] Inventors: Michel Vilkas, Paris; Guy Sénéchal, Saint Cloud, both of France

[73] Assignee: L'Air Liquide Societe Anonyme Pour 'Etude et Exploitation des Procedes Georges Claude, Paris, France

[22] Filed: Sept. 18, 1970

[21] Appl. No.: 73,626

[30] Foreign Application Priority Data
Sept. 23, 1969 France .................. 69.3282

[52] U.S. Cl. ......... 260/602, 260/566 R, 260/583 H, 260/631 H, 260/631.5
[51] Int. Cl. .................. C07c 47/26, C07c 119/08
[58] Field of Search ................................ 260/602

[56] References Cited
UNITED STATES PATENTS
2,306,332   12/1942   Flisik et al. ................ 260/602
2,812,355   11/1957   Fox ............................. 260/602

FOREIGN PATENTS OR APPLICATIONS
2,064,534   7/1971   France ........................ 260/602
2,045,888   4/1971   Germany ..................... 260/602

OTHER PUBLICATIONS
Mannich et al., (I), Berichte, Vol., 74, pages 1637–1641, 1941.
Mannich et al., Ber. Vol. 69, pages 2112–2123, 1936.

Primary Examiner—Joseph E. Evans
Assistant Examiner—David B. Springer
Attorney, Agent, or Firm—Browdy and Neimark

[57] ABSTRACT

The invention is concerned with a new process for preparing 7-hydroxy dihydrocitronellal. This process consists in causing citronellal to react with a secondary amine, in transforming the derivative obtained, by treatment in aqueous acid medium, into the immonium of the citronellal, which is hydrated, then in hydrolysing the immonium of the hydroxycitronellal thus formed into 7-hydroxy dihydrocitronellal, all these operations being effected in the liquid base.

10 Claims, No Drawings

PREPARATION OF HYDROXYCITRONELLAL

SPECIFICATION

The present invention is concerned with a new process for preparing 7 - hydroxy dihydrocitronellal ("hydroxycitronella").

It has long been known how to prepare hydroxycitronellal from citronellal by means of its bisulphite derivative. However, this method has the disadvantage of having to use a solid derivative which is difficult to handle; moreover, the bisulphite which is used can react to a greater or lesser degree with the double bond of the citronellal.

A simple process by which it is possible to obtain a hydroxycitronellal of excellent olfactory quality, the applications of which in perfumery are well known, has been discovered in accordance with the present invention. This product is obtained with good yields, while avoiding the previously mentioned disadvantages.

This new process consists in causing citronellal to react with a secondary amine, in transforming the derivative obtained, by treatment in aqueous acid medium, into the immonium of the citronellal, which is hydrated, then in hydrolysing the immonium of the hydroxycitronellal as thus formed into 7 - hydroxydihydrocitronellal, all these operations being effected in the liquid phase.

The following reaction diagram can be proposed:

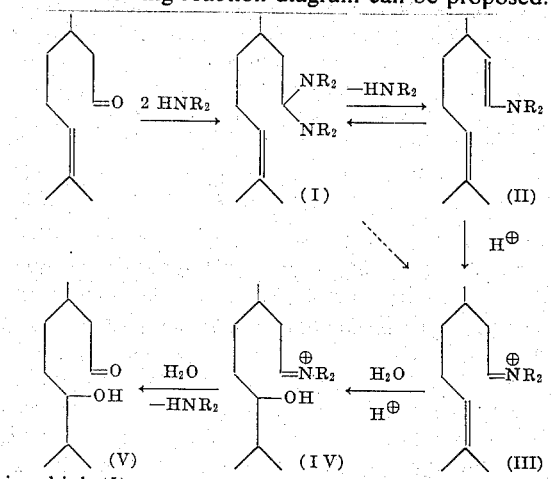

in which (I) represents an animal in equilibrium at ambient temperature with the corresponding enamine (II), this latter forming the main product of the mixture, (III) represents an immonium of citronellal, (IV) represents an immonium of the 7 - hydroxy-dihydrocitronellal and (V) represents 7 - hydroxy-dihydrocitronellal. The passage from the compound (II) to the compound (IV) is effected in a single operation. Furthermore, the transformation of the small proportion of aminal (I) directly into immonium (III) is not excluded.

The secondary amines are in general suitable for carrying out the process. Secondary lower alkyl amines, e.g. dimethylamine or diethylamine, or pyrrolidine are chosen for preference.

In general practice, between one and two moles of secondary amine are used for one mole of initial citronellal, and preferably about 1.3 moles.

It is advantageous to effect the first two reaction stages of the process at low temperatures. Thus, during the action of the secondary amine on the citronellal, the temperature is kept below ambient temperature; the formation of the immonium of the citronellal takes place between $-30°$ and $0°C$.

According to one method of the invention, the enamine which is formed is transformed into the immonium of citronellal by pouring it into an aqueous solution of a strong acid, such as sulphuric acid, preferably sulphuric acid with a concentration chosen between 30% and 70% by weight, and more particularly 42% by weight.

It was found that it is desirable to work with reduced volumes to avoid the liberation of large quantities of heat at the time of neutralisation.

The acid solution containing the immonium of citronellal (III) is brought to ambient temperature, in order that the hydration of the double bond to give the immonium of 7 - hydroxy-dihydrocitronellal(IV) is effected in a reasonable time which is of the order of 2 hours.

According to one variant of the invention, with the object of obtaining a final product of excellent olfactory quality, the sulphuric acid solution containing the immonium of citronellal is treated with an organic solvent so as to eliminate the secondary products which are formed, in large part isopulegol, probably formed as a result of a partial hydrolysis of the enamine concurrently with the formation of the immonium; the citronellal, thus regenerated, is cyclised into isopulegol under the influence of the acidity of the medium.

The hydrolysis of the immonium (IV) into 7 - hydroxydihydrocitronellal is effected by neutralisation of the acid mixture by means of an aqueous solution of a strong base, caustic soda or caustic potash, keeping the temperature within limits such that the alkali salt, generally the alkali sulphate, which is formed remains in solution. It is preferred to work in the presence of an organic solvent, which dissolves the 7 - hydroxy-dihydrocitronellal as it is formed.

It is also possible to prepare the 7 -hydroxycitronellal from natural oils containing citronellal, and this without previous distillation. According to the variant previously indicated, it is possible to eliminate from the acid solution of the immonium of citronellal, the majority of the impurities contained in the crude oil. These impurities contain a high proportion of isopulegol, which is recovered and subsequently hydrogenated into menthol.

Examples illustrating the invention in a nonlimiting manner are given below.

EXAMPLE 1

0.5 Mole of citronellal is added gradually with stirring to 0.65 mole of dimethylamine at about 0°C. At the end of addition, the reaction mixture is slowly brought to 35°C and it is subjected to a partial vacuum in order to eliminate the excess dimethylamine.

The enamine thus obtained is poured gradually into an aqueous solution of 42 % by weight sulphuric acid, containing 1.7 moles of acid; the temperature during this time is kept in the region of $-10°C$. With the addition completed, the acid solution of immonium is re-heated to ambient temperature and left standing for 2 hours, the period required for hydration of the double bond.

The acid solution is then partially neutralised in the region of 30°C, by an aqueous solution of 20 % sodium hydroxide to pH = 4. The pH is then adjusted to 6 with a saturated solution of sodium bicarbonate. This neutralisation is effected in the presence of 200 ml of hexane, which dissolves the hydroxycitronellal as it is formed. After decantation, the aqueous phase is washed twice with 200 ml of hexane. The combination of the different hexane extracts is then washed with dilute hydrochloric acid and then with a saturated solution of sodium bicarbonate. After drying over anhydrous sodium sulphate, the hexane is driven off and the 7-hydroxy-dihydrocitronellal distiled, (in the presence of 1 % of triethanolamine to avoid considerable residues), at 108°–110°C under a pressure of 5.4 millibars. The yield by weight is 90 % with respect to the citronellal.

EXAMPLE 2

After the formation of the immonium of the citronellal and its hydration in acid medium, as has been described in connection with Example 1, the acid solution of immonium of hydroxycitronellal as thus formed is washed with twice 100 ml of hexane so as to eliminate all traces of organic by-products which may be in suspension in the acid phase. The combined two hexane extracts are washed with a small quantity of 60 % sulphuric acid and the acid fraction obtained by decantation is combined with the immonium solution.

This solution is then treated under the conditions of Example 1 and distillation provides 7-hydroxy-dihydrocitronellal with a yield of 89 %. The olfactory quality of this hydroxycitronellal is better than that obtained in Example 1, because of the purification of the acid solution of the immonium compound.

EXAMPLE 3

0.5 Mole of citronellal is poured gradually at 0°C with stirring into 1 mole of dimethylamine in solution in 150 ml of anhydrous ether. On completing the addition, the temperature is allowed to return to ambient temperature and 25 g of anhydrous potassium carbonate are added for drying the mixture. They are left in contact for 1 hour and the carbonate is filtered. After evaporation of the ether, the enamine is obtained.

This latter is then treated under the same conditions as those described in Example 1. A hydroxycitronellal is obtained, of which the yield and quality are similar to those obtained in Example 1.

EXAMPLE 4

The enamine prepared according to Example 1 is poured gradually into an aqueous 42 % sulphuric acid solution containing 2.5 moles of acid. During this addition, the temperature is kept at −10°C. The reaction mixture is then brought to ambient temperature and left to stand for half an hour, this being the time necessary for the hydration with the quantity of acid employed.

The acid solution is then neutralised under the conditions described in Example 1. Distillation gives 7-hydroxy-dihydrocitronellal with a yield of 88 %.

EXAMPLE 5

1.6 kg Of "Chinese eucalyptus citroidora" oil (containing 73 % of citronellal, i.e.; 7.5 moles) are placed in a 6-litre reactor. 9.75 Moles of dimethylamine are gradually added thereto at about 0°C and while stirring. When the addition is completed, the reaction mixture is brought to 35°C and subjected to a partial vacuum for 45 minutes to eliminate the amine in excess.

The enamine thus prepared is then introduced into a 20-litre reactor, in which is an aqueous 42 % sulphuric acid solution comprising 27 moles of acid. The addition is effected gradually, keeping the temperature at −10°.C. The citronellal is then transformed into immonium sulphate which is soluble in the aqueous phase and the other organic products contained in the initial oil are extracted twice with toluene. The substance is then left standing for 2 hours, during which the immonium of the citronellal is hydrated.

The solution is then neutralised with 20 % sodium hydroxide solution and then with a saturated solution of sodium bicarbonate to a pH of 6. This neutralisation takes place in the presence of toluene. The toluenic layer is decanted and the aqueous phase is washed twice in toluene. The toluenic phases are combined and washed in succession with dilute hydrochloric acid and a bicarbonate solution. Distillation takes place after having driven off the solvent. A yield of 90 % is obtained.

We claim:
1. A process for the preparation of 7-hydroxy dihydrocitronellal, comprising:
   reacting citronellal with a secondary lower alkyl amine or pyrrolidine, in liquid phase, to provide an enamine, at between about −30°C and ambient temperature;
   converting said enamine to the immonium of citronellal by treatment in the liquid phase of said enamine in a 30% to 70% solution of sulfuric acid at between about −30° and 0°C;
   heating the resultant reaction mixture to ambient temperature and maintaining at ambient temperature to hydrate said immonium citronellal to form immonium 7-dihydroxy citronellal;
   hydrolysing said immonium 7-dihydroxy citronellal in the liquid phase to 7-hydroxy-dihydrocitronellal; and
   recovering the 7-hydroxy dihydrocitronellal.

2. A process for the preparation of 7-hydroxy-dihydrocitronellal according to claim 1, wherein the amine is a member selected from the group consisting of dimethylamine, diethylamine and pyrrolidine.

3. A process for the preparation of 7-hydroxy-dihydrocitronellal according to claim 1, wherein 1 to 2 moles of secondary amine are reacted per mole of citronellal.

4. A process for the preparation of 7-hydroxy-dihydrocitronellal, according to claim 1, wherein the enamine is transformed into the immonium of citronellal by pouring it into said sulfuric acid solution.

5. A process for the preparation of 7-hydroxycitronellal according to claim 1, wherein the said initially formed derivative is transformed into immonium of citronellal by pouring it into the sulphuric acid with a concentration which is between 42% and 60%.

6. A process for the preparation of 7-hydroxy-dihydrocitronellal according to claim 1, wherein the acid is used at the rate of 2 to 5 moles per mole of citronellal.

7. A process for the preparation of 7-hydroxy-dihydrocitronellal according to claim 1, wherein said hydration is carried out by bringing the acid medium containing the immonium of citronellal to ambient temperature.

8. A process for the preparation of 7-hydroxy-dihydrocitronellal according to claim 1, wherein the acid medium containing the immonium of citronellal is treated with hexane or toluene to eliminate the isopulegal and other impurities formed.

9. A process for the preparation of 7-hydroxy-dihydrocitronellal, especially from natural oils containing citronellal, according to claim 1, wherein the hydrolysis of the immonium of 7-hydroxy-dihydrocitronellal is effected by neutralising the acid medium by means of an aqueous solution of a strong base and in the presence of hexane or toluene to dissolve the 7-hydroxy-dihydrocitronellal as it forms, while keeping the temperature in limits such that the alkali salt which is formed remains in solution.

10. A process in accordance with claim 1 wherein said secondary amine is dimethyl amine and wherein said reaction between citronellal and dimethyl amine is carried out at between about −30° and 0°C.

* * * * *

UNITED STATES PATENT OFFICE
CERTIFICATE OF CORRECTION

Patent No. 3,852,360      Dated December 3, 1974

Inventor(s) Michel VILKAS et al

It is certified that error appears in the above-identified patent and that said Letters Patent are hereby corrected as shown below:

Column 1, line 5 should read --droxycitronellal").--

Column 1, line 29, the diagram should read:

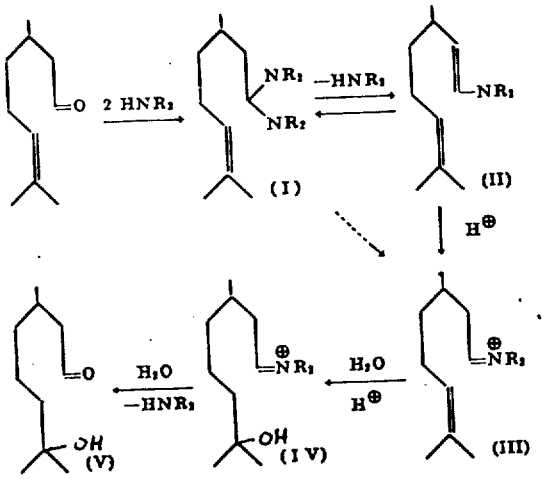

Signed and sealed this 22nd day of April 1975.

(SEAL)
Attest:

RUTH C. MASON
Attesting Officer

C. MARSHALL DANN
Commissioner of Patents
and Trademarks